United States Patent
Takahashi et al.

(10) Patent No.: US 10,998,138 B2
(45) Date of Patent: May 4, 2021

(54) SOLID ELECTROLYTIC CAPACITOR AND METHOD OF MANUFACTURING SOLID ELECTROLYTIC CAPACITOR

(71) Applicant: TOKIN Corporation, Sendai (JP)

(72) Inventors: Masanori Takahashi, Sendai (JP); Satoshi Iwai, Sendai (JP); Yusuke Hoshina, Sendai (JP)

(73) Assignee: TOKIN CORPORATION, Sendai (JP)

(*) Notice: Subject to any disclaimer, the term of this patent is extended or adjusted under 35 U.S.C. 154(b) by 53 days.

(21) Appl. No.: 16/210,416

(22) Filed: Dec. 5, 2018

(65) Prior Publication Data
US 2019/0392997 A1    Dec. 26, 2019

(30) Foreign Application Priority Data

Jun. 20, 2018 (JP) .............................. JP2018-116669

(51) Int. Cl.
| H01G 9/15 | (2006.01) |
| H01G 9/07 | (2006.01) |
| H01G 9/00 | (2006.01) |
| H01G 9/042 | (2006.01) |
| H01G 9/025 | (2006.01) |

(52) U.S. Cl.
CPC .............. *H01G 9/15* (2013.01); *H01G 9/0032* (2013.01); *H01G 9/0036* (2013.01); *H01G 9/025* (2013.01); *H01G 9/0425* (2013.01); *H01G 9/07* (2013.01)

(58) Field of Classification Search
CPC ........ H01G 9/15; H01G 9/012; H01G 9/0425; H01G 9/045; H01G 9/0525; H01G 9/08; H01G 9/025; H01G 9/0032; H01G 9/0036; H01G 9/07
See application file for complete search history.

(56) References Cited

U.S. PATENT DOCUMENTS

2013/0236636 A1* 9/2013 Nobuta ................ H01G 9/0036 427/80
2018/0277312 A1* 9/2018 Tsubaki ................. H01G 9/151

FOREIGN PATENT DOCUMENTS

| CN | 103305000 A | 9/2013 |
| JP | 2011151205 A | 8/2011 |
| WO | 2017094242 A1 | 6/2017 |

OTHER PUBLICATIONS

China National Intellectual Property Administration, Office Action and Search Report Issued in Application No. 201910047219.X, dated Dec. 28, 2020, 21 pages.

* cited by examiner

*Primary Examiner* — Michael P McFadden
(74) *Attorney, Agent, or Firm* — McCoy Russell LLP

(57) ABSTRACT

A solid electrolytic capacitor according to the present disclosure includes an anode body made of a porous valve metal, a dielectric layer formed on a surface of the anode body, and a solid electrolyte layer formed on the dielectric layer. A carboxylic acid ester is filled in at least part of cavities inside the solid electrolyte layer. By the solid electrolytic capacitor according to the present disclosure, it is possible to provide a solid electrolytic capacitor capable of suppressing an increase in ESR and an increase in leakage current.

9 Claims, 4 Drawing Sheets

SOLID ELECTROLYTIC CAPACITOR AND METHOD OF MANUFACTURING SOLID ELECTROLYTIC CAPACITOR

CROSS REFERENCE TO RELATED APPLICATION

The present application claims priority to Japanese patent application No. 2018-116669, filed on Jun. 20, 2018. The entire contents of the above-identified application are incorporated herein by reference for all purposes.

BACKGROUND

The present disclosure relates to a solid electrolytic capacitor and a method of manufacturing a solid electrolytic capacitor.

A solid electrolytic capacitor is widely used in various fields such as electronic equipment today. Japanese Unexamined Patent Application Publication No. 2011-151205 discloses a technique related to a solid electrolytic capacitor using conductive polymers as solid electrolyte.

SUMMARY

As described above, Japanese Unexamined Patent Application Publication No. 2011-151205 discloses a technique related to a solid electrolytic capacitor using conductive polymers as solid electrolyte. The conductive polymers have the properties of low density and many cavities. Particularly, when a polymerized film of conductive polymer is formed by chemical oxidative polymerization, the density of the formed conductive polymer is low, and a large number of cavities are formed in the conductive polymer.

As described above, when a material with low density and many cavities is used for a solid electrolyte layer, the strength of the solid electrolyte layer is degraded. Therefore, when the mechanical stress is applied to the solid electrolyte layer in the reflow process when forming the exterior of or mounting a solid electrolytic capacitor, there is a possibility that the solid electrolyte layer is deformed and it peels or cuts off, which can cause a decrease in the electrical conductivity of the solid electrolyte layer. The decrease in the conductivity of the solid electrolyte layer raises a problem that the equivalent series resistance (ESR) of the solid electrolytic capacitor increases.

Further, when there are a large number of cavities in a solid electrolyte layer, there is a possibility that, upon compression of the solid electrolyte layer, a cathode layer (graphite layer) formed on the solid electrolyte layer penetrates the solid electrolyte layer and thereby the cathode layer and a dielectric layer partly come into contact with each other. This can lead to problems such as an increase in leakage current and the occurrence of short-circuit in the solid electrolytic capacitor.

In view of the foregoing, an object of the present disclosure is to provide a solid electrolytic capacitor and a method of manufacturing a solid electrolytic capacitor capable of suppressing an increase in ESR and an increase in leakage current.

A solid electrolytic capacitor according to one aspect of the present disclosure includes an anode body made of a porous valve metal, a dielectric layer formed on a surface of the anode body, and a solid electrolyte layer formed on the dielectric layer, wherein a carboxylic acid ester is present in at least part of cavities inside the solid electrolyte layer.

A method of manufacturing a solid electrolytic capacitor according to one aspect of the present disclosure includes a step of forming a dielectric layer on a surface of an anode body made of a porous valve metal, a step of forming a solid electrolyte layer on the dielectric layer, and a step of forming a carboxylic acid ester in at least part of cavities inside the solid electrolyte layer.

According to the present disclosure, it is possible to provide a solid electrolytic capacitor and a method of manufacturing a solid electrolytic capacitor capable of suppressing an increase in ESR and an increase in leakage current.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure is described hereinafter with reference to the drawings.

Figure 1:
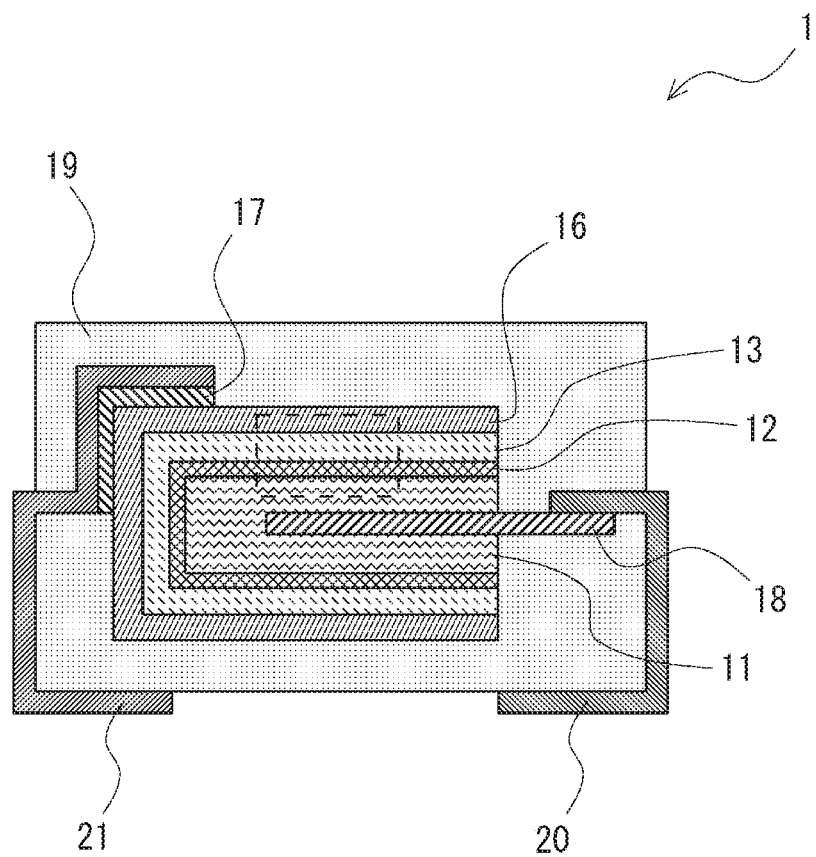
FIG. 1 is a cross-sectional view of a solid electrolytic capacitor according to an embodiment.

FIG. 1 is a cross-sectional view of a solid electrolytic capacitor according to an embodiment. As shown in FIG. 1, a solid electrolytic capacitor 1 according to this embodiment includes an anode body 11, a dielectric layer 12, a solid electrolyte layer 13, a cathode layer 16, a conductive adhesive 17, an anode lead 18, an exterior resin 19, and lead frames 20 and 21.

In the solid electrolytic capacitor 1 according to this embodiment, the dielectric layer 12, the solid electrolyte layer 13 and the cathode layer 16 are sequentially stacked on top of the anode body 11 as shown in FIG. 1. The anode body 11 has the anode lead 18, and the anode lead 18 is connected to the lead frame 20. The anode lead 18 is connected to the lead frame 20 by welding, for example. Further, the cathode layer 16 is connected to the lead frame 21 through the conductive adhesive 17. The cathode layer 16 can be formed by stacking a graphite layer and a silver layer, for example. The solid electrolytic capacitor 1 according to this embodiment is covered with the exterior resin 19 with part of the two lead frames 20 and 21 exposed to the outside.

Figure 2:
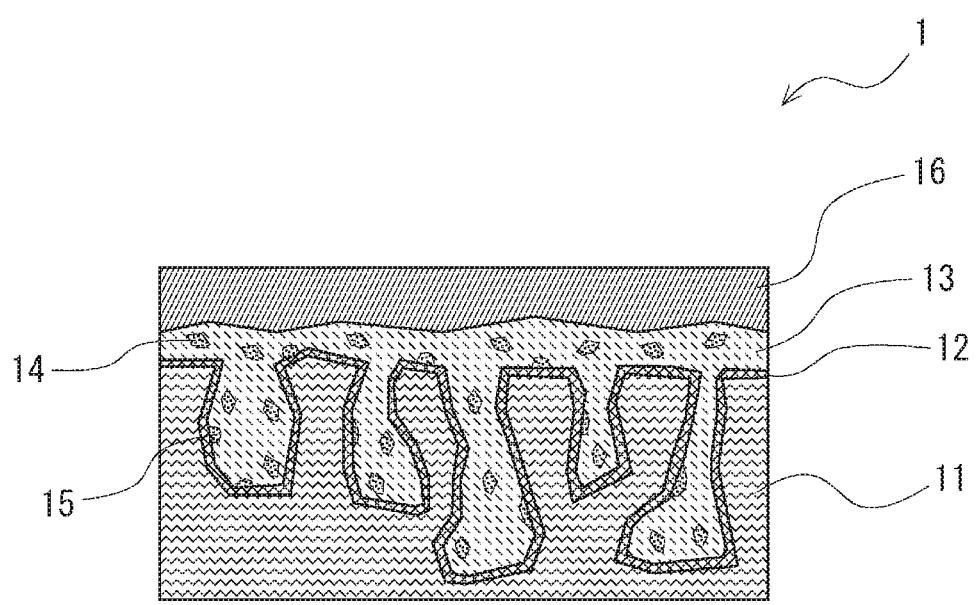
FIG. 2 is an enlarged cross-sectional view of the solid electrolytic capacitor according to the embodiment.

FIG. 2 is an enlarged cross-sectional view of the solid electrolytic capacitor according to this embodiment, and it shows the cross-section of and near the part enclosed by the dashed line in FIG. 1 in an enlarged scale. As shown in FIG. 2, the anode body 11 is formed using a porous valve metal. For the anode body 11, at least one kind selected from the group consisting of tantalum (Ta), aluminum (Al), niobium (Nb), titanium (Ti), zirconium (Zr), hafnium (Hf) and tungsten (W) or an alloy of those metals can be used, for example. Particularly, it is preferable to use at least one kind selected from the group consisting of tantalum (Ta), aluminum (Al) and niobium (Nb) or an alloy of those metals for the anode body 11. The anode body 11 is formed using a plate-shaped, foil-shaped or line-shaped valve metal, a sintered body containing valve metal particles, a porous valve metal enlarged by etching or the like, for example.

The dielectric layer 12 is formed on the surface of the anode body 11. The dielectric layer 12 can be formed by anodic oxidation of the surface of the anode body 11, for example. As shown in FIG. 2, the surface of the anode body 11 is porous, and the dielectric layer 12 is formed also in the porous holes. For example, when tantalum is used for the anode body 11, an oxidized tantalum film (dielectric layer 12) is formed on the surface of the anode body 11 by anodic oxidation of the anode body 11. The thickness of the dielectric layer 12 can be adjusted as appropriate by an anodic oxidation voltage, for example.

The solid electrolyte layer 13 is formed on the dielectric layer 12. As shown in FIG. 2, the solid electrolyte layer 13 is formed also inside the holes of the anode body 11 where the dielectric layer 12 is formed. Thus, the solid electrolyte layer 13 is formed in contact with the entire surface of the dielectric layer 12. Further, there are cavities inside the solid electrolyte layer 13, and a carboxylic acid ester 14 is formed (filled) in at least part of the inside cavities. Furthermore, there are cavities also at the interface between the dielectric layer 12 and the solid electrolyte layer 13, and a carboxylic acid ester 15 is formed (filled) in at least part of the cavities at this interface.

Note that, although the carboxylic acid ester filled in the cavities inside the solid electrolyte layer 13 is designated by the reference symbol 14, and the carboxylic acid ester filed in the cavities at the interface between the dielectric layer 12 and the solid electrolyte layer 13 is designated by the reference symbol 15 in FIG. 2, the carboxylic acid esters 14 and 15 are the same material.

For example, the solid electrolyte layer 13 can be formed using conductive polymers. When forming the solid electrolyte layer 13, chemical oxidative polymerization, electropolymerization or the like can be used, for example. Further, the solid electrolyte layer 13 may be formed by applying (being impregnated with) a conductive polymer solution and drying it.

Particularly, when the conductive polymer (solid electrolyte layer 13) is formed by chemical oxidative polymerization, the density of the formed conductive polymer is low, and a large number of cavities are formed inside the conductive polymer. Thus, the present disclosure is suitably used when the conductive polymer are formed by chemical oxidative polymerization (i.e., when the conductive polymer with low density and many cavities is used as the solid electrolyte layer 13).

The solid electrolyte layer 13 preferably contains polymers made up of monomers containing at least one of pyrrole, thiophene, aniline and a derivative of them, for example. In addition, it preferably contains a sulfonic acid compound as a dopant.

In addition to the conductive polymer described above, the solid electrolyte layer 13 may contain an oxide material such as manganese dioxide or ruthenium oxide, an organic semiconductor such as TCNQ (7,7,8,8,-tetracyanoquinodimethane complex salt) or the like.

As shown in FIG. 2, in the solid electrolytic capacitor 1 according to this embodiment, the carboxylic acid ester 14 is filled in at least part of the cavities formed inside the solid electrolyte layer 13. Further, the carboxylic acid ester 15 is filled in at least part of the cavities formed at the interface between the dielectric layer 12 and the solid electrolyte layer 13. For the carboxylic acid esters 14 and 15, a combination of carboxylic acid esters obtained by reaction of a carboxylic acid with a material containing a hydroxyl group can be used. The carboxylic acid may be a carboxylate.

For example, for the carboxylic acid esters 14 and 15, a compound of polyglycerol and at least one kind selected from adipic acid and adipic acid ammonium can be used. Specifically, the carboxylic acid esters 14 and 15 can be obtained by reaction of at least one kind selected from adipic acid and adipic acid ammonium, which is used as a carboxylic acid, with polyglycerol, which is used as a material containing a hydroxyl group.

For example, when filling the carboxylic acid esters 14 and 15 into the cavities of the solid electrolyte layer 13, after forming the solid electrolyte layer 13, the anode body 11 on which the dielectric layer 12 and the solid electrolyte layer 13 are formed is immersed in a mixed solution of adipic acid (adipic acid ammonium) and polyglycerol to impregnate the cavities of the solid electrolyte layer 13 with the mixed solution, and then dried at high temperature to thereby make ester bond between adipic acid (adipic acid ammonium) and polyglycerol and form the carboxylic acid ester. Because the esterification temperature is 130° C. or higher, the drying temperature is preferably 130° C. or higher.

Further, the molecular weight of the polyglycerol is preferably 500 or more. When the molecular weight of the polyglycerol is 500 or more, the decomposition temperature of the polyglycerol is 250° C. or higher, and the heat resistance of the formed carboxylic acid esters 14 and 15 is improved.

The viscosity of the polyglycerol increases as the molecular weight is greater. Further, the number of OH groups per unit weight of the polyglycerol is smaller as the molecular weight of the polyglycerol is greater. Thus, in consideration of the viscosity and the tendency of ester bond (the number of OH groups) of the polyglycerol, the molecular weight of the polyglycerol is preferably 500 to 600.

Further, the mass of the carboxylic acid esters 14 and 15 is preferably 10% or more of the mass of the solid electrolyte layer 13. By setting the mass of the carboxylic acid esters 14 and 15 to 10% or more of the mass of the solid electrolyte layer 13, it is possible to fill in the cavities of the solid electrolyte layer 13.

Further, in the solid electrolytic capacitor 1 according to this embodiment, the solid electrolyte layer 13 may have a two-layer structure. For example, the solid electrolyte layer 13 may have a two-layer structure including a first solid electrolyte layer formed on the dielectric layer 12 and a second solid electrolyte layer formed on the first solid electrolyte layer. In this case, a carboxylic acid ester is filled into at least part of the cavities of the first solid electrolyte layer (i.e., the first solid electrolyte layer in contact with the dielectric layer 12). Specifically, to form the solid electrolyte layer 13 in a two-layer structure, the first solid electrolyte layer containing a carboxylic acid ester is formed first, and then the second solid electrolyte layer is formed on the first solid electrolyte layer.

Further, in the solid electrolytic capacitor 1 according to this embodiment, the solid electrolyte layer 13 may have a three or more-layer structure. In this case, a carboxylic acid ester is filled into the cavities of at least the first solid electrolyte layer (i.e., the solid electrolyte layer in contact with the dielectric layer 12).

After forming the solid electrolyte layer 13 in the above manner, the cathode layer 16 is formed on the solid electrolyte layer 13. The cathode layer 16 can be formed by stacking a graphite layer and a silver layer. Note that the graphite layer and the silver layer are just an example, and a material of the cathode layer 16 is not particularly limited as long as it is a material having conductivity.

As described earlier, Japanese Unexamined Patent Application Publication No. 2011-151205 discloses a technique related to a solid electrolytic capacitor using conductive polymers as solid electrolyte. The conductive polymers have the properties of low density and many cavities. Particularly, when a polymerized film of conductive polymer is formed by chemical oxidative polymerization, the density of the formed conductive polymer is low, and a large number of cavities are formed in the conductive polymer.

As described above, when a material of low density and many cavities is used for a solid electrolyte layer, the strength of the solid electrolyte layer is degraded. Therefore, when the mechanical stress is applied to the solid electrolyte layer in the reflow process when forming the exterior of or mounting a solid electrolytic capacitor, there is a possibility that the solid electrolyte layer is deformed and it peels or cuts off, which can cause a decrease in the electrical conductivity of the solid electrolyte layer. The decrease in the conductivity of the solid electrolyte layer raises a problem that the ESR of the solid electrolytic capacitor increases.

Further, when there are a large number of cavities in a solid electrolyte layer, there is a possibility that, upon compression of the solid electrolyte layer, a cathode layer (graphite layer) formed on the solid electrolyte layer penetrates the solid electrolyte layer and thereby the cathode layer and a dielectric layer partly come into contact with each other. This can lead to problems such as an increase in leakage current and the occurrence of short-circuit in the solid electrolytic capacitor.

In order to solve such problems, in the solid electrolytic capacitor 1 according to this embodiment, the carboxylic acid ester 14 is filled in at least part of the cavities inside the solid electrolyte layer 13. When the carboxylic acid ester 14 is filled in the cavities inside the solid electrolyte layer 13 in this manner, it is possible to fill in the cavities of the solid electrolyte layer 13 with the carboxylic acid ester 14 and thereby increase the density of the solid electrolyte layer 13. This enhances the strength of the solid electrolyte layer 13, and therefore even when the mechanical stress is applied to the solid electrolyte layer 13 during manufacture of the solid electrolytic capacitor 1, it is possible to suppress the deformation of the solid electrolyte layer 13. Consequently, it is possible to suppress a decrease in the conductivity of the solid electrolyte layer 13 and thereby suppress an increase in the ESR of the solid electrolytic capacitor.

Further, it is possible to prevent the cathode layer 16 (graphite layer) formed on the solid electrolyte layer 13 from penetrating the solid electrolyte layer 13 upon compression of the solid electrolyte layer 13. It is thereby possible to prevent the cathode layer 16 and the dielectric layer 12 from partly coming into contact with each other, and thereby suppress an increase in leakage current and the occurrence of short-circuit in the solid electrolytic capacitor 1.

Further, the carboxylic acid ester exhibits conductivity because the carboxyl group remains partly. Therefore, it is possible to suppress an increase in the resistance of the solid electrolyte layer 13 when filling the carboxylic acid ester 14 into the cavities inside the solid electrolyte layer 13. It is thereby possible to suppress an increase in the ESR of the solid electrolytic capacitor 1.

Further, in the solid electrolytic capacitor 1 according to this embodiment, the solid electrolyte layer 13 is formed in contact with the dielectric layer 12, and the carboxylic acid ester 15 is filled in at least part of the cavities at the interface between the dielectric layer 12 and the solid electrolyte layer 13. Because the carboxylic acid ester can anodize a valve metal (i.e., has chemical conversion ability), it is possible to repair the dielectric layer 12 when a defect occurs in the dielectric layer 12 and thereby stabilize the leakage current.

Further, when a material with low heat resistance is used as a material to be filled into the cavities inside the solid electrolyte layer, there is a possibility that gas is released from the filled material due to heat in the reflow process for mounting or the like. The release of gas can cause an increase in ESR and the occurrence of cracks in the exterior resin.

In order to solve the above problems, the carboxylic acid esters 14 and 15 with high heat resistance are used as a material to be filled into the cavities inside the solid electrolyte layer 13 in the solid electrolytic capacitor 1 according to this embodiment. To be specific, when forming the carboxylic acid esters, polyglycerol with a decomposition temperature of 250° C. or higher (polyglycerol with a molecular weight of 500 to 600) is used and further polyglycerol is esterified with adipic acid (adipic acid ammonium), thereby improving the heat resistance. It is thereby possible to suppress the release of gas from the filled material due to heat in the reflow process for mounting or the like. It is thus possible to suppress an increase in ESR and the occurrence of cracks in the exterior resin.

As described above, according to the embodiments of the present disclosure, it is possible to provide a solid electrolytic capacitor and a method of manufacturing a solid electrolytic capacitor capable of suppressing an increase in ESR and an increase in leakage current.

EXAMPLE

The present disclosure is described more specifically based on several examples below; however, the present disclosure is not limited to those examples.

Example 1

A sample according to Example 1 was produced using the following method.

First, a tantalum sintered body was produced using tantalum powder. To be specific, tantalum powder in which an anode lead (tantalum wire) was embedded was press-molded. The molded body formed thereby was a rectangular solid of 1.7 mm long, 2.2 mm wide and 1.2 mm deep. After that, this molded body was sintered at 1500° C., and thereby a tantalum sintered body was produced.

Next, the produced tantalum sintered body was anodized in a phosphoric acid solution to form a dielectric layer on the surface of the tantalum sintered body. The condition for anodic oxidation was 40V.

After that, the tantalum sintered body where the dielectric layer was formed on the surface was immersed in a solution including a monomer solution containing 3,4-ethylenedioxythiophene, 1,3,6-naphthalenetrisulfonic acid as a dopant, and an oxidant solution containing ammonium peroxodisulfate as an oxidizing agent. This immersion was repeated several times, and a solid electrolyte layer (conductive polymer layer) containing poly(3,4-ethylenedioxythiophene) was formed using chemical oxidative polymerization.

Then, a solution was produced by mixing, using a stirrer, 40 wt % polyglycerol #500 (manufactured by Sakamoto Yakuhin Kogyo Co., Ltd.; polyglycerol with an average molecular weight of 500), 5 wt % adipic acid ammonium and 55 wt % water ($H_2O$). Then, the sample where the layers up to the solid electrolyte layer were formed was immersed in the produced solution. After that, this sample was pulled out of the solution, dried at 150° C. for 60 minutes to form a carboxylic acid ester. In this manner, the carboxylic acid ester was filled into the cavities of the solid electrolyte layer.

Then, a cathode layer was formed by stacking a graphite layer and a silver layer on the solid electrolyte layer. A graphite paste was used for the graphite layer, and a silver paste was used for the silver layer. Then, the anode lead and the lead frame on the anode side were connected using welding. Further, the cathode layer and the lead frame on the cathode side were connected using a conductive adhesive. After that, the sample was covered with exterior resin with part of the two lead frames exposed to the outside, and thereby the solid electrolytic capacitor was formed.

Example 2

A sample according to Example 2 was produced using the following method.

First, a tantalum sintered body was produced by the same method as in Example 1. After that, anodic oxidation was carried out by the same method as in Example 1 to form a dielectric layer on the surface of the tantalum sintered body. Further, a solid electrolyte layer (conductive polymer layer) was formed on the dielectric layer by the same method as in Example 1.

Then, a solution was produced by mixing, using a stirrer, 40 wt % polyglycerol #500 (manufactured by Sakamoto Yakuhin Kogyo Co., Ltd.; polyglycerol with an average molecular weight of 500), 5 wt % adipic acid ammonium and 55 wt % water ($H_2O$). Then, the sample where the layers up to the solid electrolyte layer were formed was immersed in the produced solution. After that, this sample was pulled out of the solution, dried at 150° C. for 60 minutes to form a carboxylic acid ester. In this manner, the carboxylic acid ester was filled into the cavities of the solid electrolyte layer.

Then, a solid electrolyte layer made of a conductive polymer solution was formed on the solid electrolyte layer. To be specific, the second solid electrolyte layer was formed by immersing the sample after forming the carboxylic acid ester in a conductive polymer solution and drying it.

After that, a cathode layer was formed by stacking a graphite layer and a silver layer on the solid electrolyte layer. A graphite paste was used for the graphite layer, and a silver paste was used for the silver layer. Then, the anode lead and the lead frame on the anode side were connected using welding. Further, the cathode layer and the lead frame on the cathode side were connected using a conductive adhesive. After that, the sample was covered with exterior resin with part of the two lead frames exposed to the outside, and thereby the solid electrolytic capacitor was formed.

Example 2 is different from Example 1 in which the solid electrolyte layer has a two-layer structure. The carboxylic acid ester filled into the solid electrolyte layer is not completely solid, and the carboxylic acid ester filled into the first solid electrolyte layer can be confined by the second solid electrolyte layer in the solid electrolyte layer having a two-layer structure as in Example 2.

Comparative Example 1

A sample where a carboxylic acid ester was not filled in the cavities of the solid electrolyte layer was produced as a sample according to Comparative Example 1. The sample according to Comparative Example 1 was the same as the sample according to Example 1 except for this.

Comparative Example 2

A sample where a carboxylic acid ester was not filled in the cavities of the first solid electrolyte layer was produced as a sample according to Comparative Example 2. The sample according to Comparative Example 2 was the same as the sample according to Example 2 except for this.

<Evaluation of Samples>

A specified number of samples according to Examples 1 and 2 and Comparative Examples 1 and 2 described above were produced, and those samples were evaluated by the following method.

Figure 3:
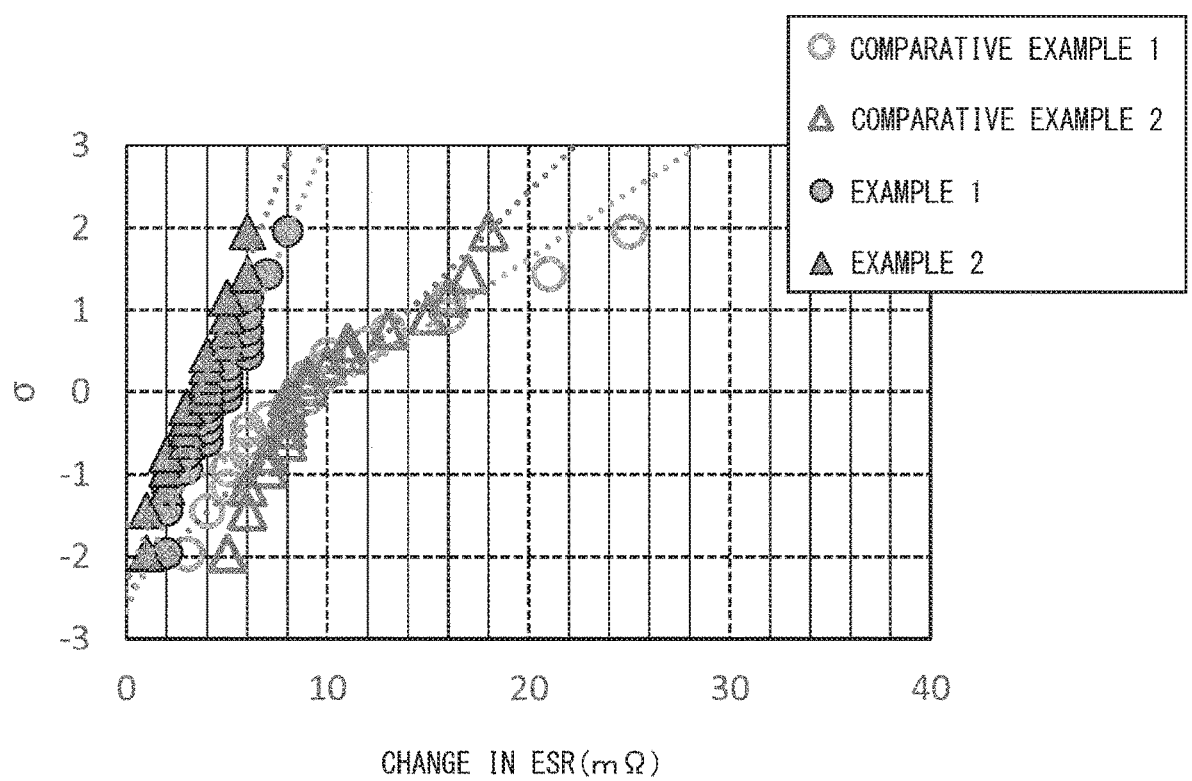
FIG. 3 is a graph showing a change in ESR of solid electrolytic capacitors.

For the samples according to Examples 1 and 2 and Comparative Examples 1 and 2, a change in ESR before and after the mounting reflow process was examined. FIG. 3 is a graph showing a change in ESR of each sample. In FIG. 3, $\sigma$ indicates a standard deviation.

As shown in FIG. 3, in the samples according to Examples 1 and 2, a change in ESR tended to be smaller than that in the samples according to Comparative Examples 1 and 2. Thus, it was possible to suppress an increase in the ESR of the solid electrolytic capacitor by filling the carboxylic acid ester into the cavities of the solid electrolyte layer.

Further, comparing the sample according to Example 1 and the sample according to Example 2, a change in ESR tended to be smaller overall in the sample according to Example 2 than in the sample according to Example 1. Thus, when the solid electrolyte layer had a two-layer structure as in Example 2, it was possible to confine the carboxylic acid ester filled into the first solid electrolyte layer by the second solid electrolyte layer, and consequently it was possible to reduce a change in the ESR of the solid electrolytic capacitor.

Figure 4:
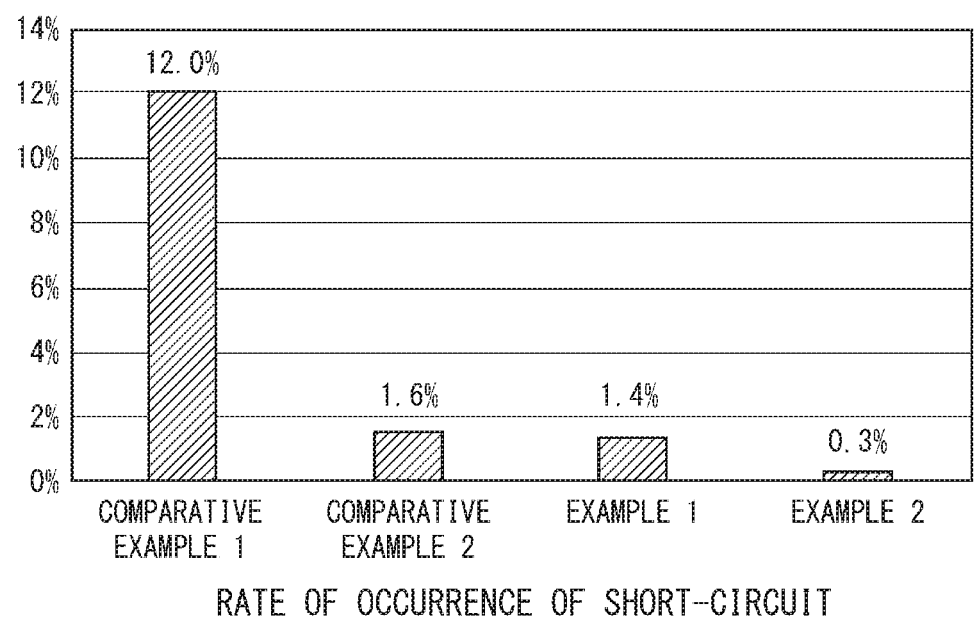
FIG. 4 is a graph showing the rate of occurrence of short-circuit in solid electrolytic capacitors.

Further, the rate of occurrence of short-circuit was examined for the samples according to Examples 1 and 2 and Comparative Examples 1 and 2. FIG. 4 is a graph showing the rate of occurrence of short-circuit in each sample.

The rate of occurrence of short-circuit was calculated by the following method. Specifically, for the samples according to Examples 1 and 2 and Comparative Examples 1 and 2, a reflow process, an aging process, a short-circuit checking process, and an inspection process were performed after forming (molding) the exterior resin. FIG. 4 shows the rate of occurrence of short-circuit in the short-circuit checking process. Note that, in the short-circuit checking, a rated voltage was applied between the electrodes of the solid electrolytic capacitor, and it was determined that short-circuit was occurring when the amount of current flowing between the electrodes was equal to or more than a specified current value. The number of samples used was 10 kp.

As shown in FIG. 4, the rate of occurrence of short-circuit was 12.0% in the sample according to Comparative Example 1, and the rate of occurrence of short-circuit was 1.6% in the sample according to Comparative Example 2. On the other hand, the rate of occurrence of short-circuit was 1.4% in the sample according to Example 1, and the rate of occurrence of short-circuit was 0.3% in the sample according to Example 2. From those results, the rate of occurrence of short-circuit was lower in the samples according to Examples 1 and 2 than in the samples according to Comparative Examples 1 and 2. Particularly, the rate of occurrence of short-circuit was 0.3% in the sample according to Example 2, which was lower than the values in the other samples.

The results of FIG. 4 showed that it was possible to suppress an increase in the leakage current of the solid electrolytic capacitor by filling the carboxylic acid ester into the cavities of the solid electrolyte layer.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A solid electrolytic capacitor comprising:
    an anode body made of a porous valve metal;
    a dielectric layer formed on a surface of the anode body; and
    a solid electrolyte layer formed on the dielectric layer,
    wherein a carboxylic acid ester is filled in at least part of voids of the solid electrolyte layer,
    the solid electrolyte layer is formed in contact with the dielectric layer, and
    the carboxylic acid ester is further filled in a plurality of voids at an interface between the dielectric layer and the solid electrolyte layer.

2. The solid electrolytic capacitor according to claim 1, wherein the carboxylic acid ester is a compound of polyglycerol and at least one kind selected from adipic acid and adipic acid ammonium.

3. The solid electrolytic capacitor according to claim 2, wherein a molecular weight of the polyglycerol is 500 to 600.

4. The solid electrolytic capacitor according to claim 1, wherein a mass of the carboxylic acid ester is equal to or more than 10% of a mass of the solid electrolyte layer.

5. The solid electrolytic capacitor according to claim 1, wherein
    the solid electrolyte layer includes
        a first solid electrolyte layer formed on the dielectric layer; and
        a second solid electrolyte layer formed on the first solid electrolyte layer, and
        the carboxylic acid ester is filled in at least part of voids of the first solid electrolyte layer.

6. A method of manufacturing a solid electrolytic capacitor, comprising: a step of forming a dielectric layer on a surface of an anode body made of a porous valve metal; a step of forming a solid electrolyte layer on the dielectric layer; and a step of forming a carboxylic acid ester in at least part of voids inside the solid electrolyte layer, wherein the step of forming a solid electrolyte layer forms the solid electrolyte layer in contact with the dielectric layer, and the step of forming a carboxylic acid ester further fills the carboxylic acid ester into at least part of voids at an interface between the dielectric layer and the solid electrolyte layer.

7. The method of manufacturing a solid electrolytic capacitor according to claim 6, wherein the step of forming a carboxylic acid ester forms the carboxylic acid ester by immersion in a solution and drying, the solution containing polyglycerol and at least one kind selected from adipic acid and adipic acid ammonium.

8. The method of manufacturing a solid electrolytic capacitor according to claim 6, comprising: a step of forming a first solid electrolyte layer and further forming a second solid electrolyte layer on the first solid electrolyte layer, the first solid electrolyte layer being the solid electrolyte layer containing the carboxylic acid ester.

9. The method of manufacturing a solid electrolytic capacitor according to claim 6, wherein the solid electrolyte layer is formed using chemical oxidative polymerization.

* * * * *